US011571965B2

(12) United States Patent
Shimanaka et al.

(10) Patent No.: US 11,571,965 B2
(45) Date of Patent: Feb. 7, 2023

(54) SIDE VEHICLE BODY STRUCTURE OF VEHICLE

(71) Applicant: MAZDA MOTOR CORPORATION, Hiroshima (JP)

(72) Inventors: Tsuneki Shimanaka, Aki-gun (JP); Kota Yoshida, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 124 days.

(21) Appl. No.: 17/177,903

(22) Filed: Feb. 17, 2021

(65) Prior Publication Data

US 2021/0276413 A1    Sep. 9, 2021

(30) Foreign Application Priority Data

Mar. 6, 2020    (JP) .............................. JP2020-038728

(51) Int. Cl.
*B60K 13/04*     (2006.01)
*B62D 25/02*     (2006.01)
*B62D 25/20*     (2006.01)

(52) U.S. Cl.
CPC ............ *B60K 13/04* (2013.01); *B62D 25/025* (2013.01); *B62D 25/2036* (2013.01)

(58) Field of Classification Search
CPC .. B60K 13/04; B62D 25/025; B62D 25/2036; F01N 2340/04; F01N 13/001; F01N 13/009
USPC ............... 296/209, 204, 187.12, 208, 203.03
See application file for complete search history.

(56) References Cited

U.S. PATENT DOCUMENTS

| | | | | |
|---|---|---|---|---|
| 3,149,856 | A | * | 9/1964 | Schilberg ........... B62D 25/2036 280/795 |
| 3,495,673 | A | * | 2/1970 | Diran ................. B62D 25/2036 280/848 |
| 4,493,506 | A | * | 1/1985 | Alexander ............. B60R 13/04 296/204 |
| 5,042,870 | A | * | 8/1991 | Yura ...................... B60K 11/08 296/180.1 |
| 5,388,408 | A | * | 2/1995 | Lawrence ............... F01N 13/02 181/239 |
| D360,171 | S | * | 7/1995 | Hubbach ....................... D12/91 |

(Continued)

FOREIGN PATENT DOCUMENTS

JP        2018-039452 A    3/2018

*Primary Examiner* — D Glenn Dayoan
*Assistant Examiner* — E Turner Hicks
(74) *Attorney, Agent, or Firm* — Studebaker & Brackett PC (57) ABSTRACT

A vehicle body side structure is provided where an exhaust apparatus is located on the vehicle-width-direction outer side relative to a side sill without widening the vehicle. Embodiments include an internal combustion engine equipped on the front side of a partition wall defining a front edge of a vehicle cabin space, an exhaust apparatus through which exhaust gas exhausted from the internal combustion engine passes, and a side sill extending along the vehicle front-rear direction on the side of a floor forming a floor surface of the vehicle cabin space. The side sill has a recess having a cross section recessed toward the vehicle-width-direction inner side from the vehicle-width-direction outer side in a cross-sectional view orthogonal to the vehicle front-rear direction and extending in the vehicle front-rear direction, and an exhaust system member provided in the exhaust apparatus is disposed at the recess.

8 Claims, 5 Drawing Sheets

(56) References Cited

U.S. PATENT DOCUMENTS

| | | | |
|---|---|---|---|
| D430,508 S * | 9/2000 | Crain | D12/92 |
| 6,141,958 A * | 11/2000 | Voss | F01N 13/009 |
| | | | 181/254 |
| D456,313 S * | 4/2002 | Walling | D12/92 |
| D687,349 S * | 8/2013 | Krugger | D12/92 |
| 10,864,816 B2 * | 12/2020 | Kato | B62D 25/20 |
| 2004/0099465 A1 * | 5/2004 | Matsumoto | B60K 13/04 |
| | | | 180/309 |
| 2015/0090518 A1 * | 4/2015 | Yoshida | B62D 25/025 |
| | | | 180/309 |
| 2018/0072352 A1 | 3/2018 | Shimoda | |
| 2020/0047808 A1 * | 2/2020 | Ajisaka | B60K 15/063 |
| 2021/0276625 A1 * | 9/2021 | Shimanaka | B62D 25/04 |
| 2021/0276627 A1 * | 9/2021 | Shimanaka | B60K 13/04 |

\* cited by examiner

SIDE VEHICLE BODY STRUCTURE OF VEHICLE

TECHNICAL FIELD

The present disclosure relates to a side vehicle body structure of a vehicle which includes, for example, an internal combustion engine equipped on the front side of a partition wall defining a front edge of a vehicle cabin space, an exhaust apparatus through which exhaust gas exhausted from the internal combustion engine passes, and a side sill extending along the vehicle front-rear direction on the side of a floor forming a floor surface of the vehicle cabin space.

BACKGROUND ART

In a vehicle, a structure has been known in which at least a part of an exhaust system member (for example, a filter for exhaust treatment, an exhaust pipe, or a silencer) forming an exhaust apparatus is provided not at the vehicle-width-direction center under a floor but on the vehicle-width-direction outer side relative to the floor (namely, a lower portion of the vehicle on the vehicle-width-direction outer side).

The aim of adopting such a configuration is roughly classified into cases where a vehicle body layout property is provided, and where motion performance of a vehicle body is emphasized. In the former case, for example, in a vehicle adopting a system using an internal combustion engine and a motor in combination, as in a hybrid car or a range extender car, a vehicle has been known in which, for example, in order to avoid a battery disposed under a floor, an exhaust system member is provided on the vehicle-width-direction outer side relative to the battery under the floor (for example, see Japanese Patent Laid-Open No. 2018-39452). In the latter case, a vehicle has been known in which, for example, as in a sports car, in order to dispose a heavy object near the center of a vehicle body, an exhaust system member, which is relatively light, is disposed at a lower portion of the vehicle on the vehicle-width-direction outer side.

Here, as an example in which the heavy object is disposed near the center of the vehicle body, the center of gravity of occupants seated on a driver seat and a passenger seat is lowered, or an interval in the vehicle width direction between the driver seat and the passenger seat which are adjacent to each other is narrowed.

On the other hand, as a specific example in which the exhaust system member is disposed at the lower portion of the vehicle on the vehicle-width-direction outer side, it is conceivable to lay out the exhaust system member in the vicinity of the vehicle-width-direction outer side of a side sill as a vehicle body structure.

However, in a case where the exhaust system member, which is relatively light, is laid out on the outer side of the side sill, a problem occurs in which the width of the vehicle expands by a width corresponding to that of the exhaust system member. Thus, in a case where the exhaust system member, which is relatively light, is laid out on the outer side of the side sill with even more emphasis on the motion performance of the vehicle, there is room for further improvement.

SUMMARY

The present disclosure has been made in view of such a problem, and provides a side vehicle body structure of a vehicle which can, even in a case where an exhaust apparatus (at least one of an exhaust member and an exhaust pipe) is provided on the vehicle-width-direction outer side relative to a side sill, avoid widening of the vehicle.

The present disclosure relates to a side vehicle body structure of a vehicle which includes an internal combustion engine equipped on the front side of a partition wall defining a front edge of a vehicle cabin space, an exhaust apparatus through which exhaust gas exhausted from the internal combustion engine passes, and a side sill extending along the vehicle front-rear direction on the side of a floor forming a floor surface of the vehicle cabin space, wherein the side sill has a recess having a cross section recessed toward the vehicle-width-direction inner side from the vehicle-width-direction outer side in a cross-sectional view orthogonal to the vehicle front-rear direction and extending in the vehicle front-rear direction, and the exhaust apparatus is disposed at the recess.

According to this configuration, even in a case where a vehicle-width-direction inner end of the exhaust apparatus is provided on the vehicle-width-direction outer side relative to a vehicle-width-direction inner end of the side sill, at least a part of the exhaust apparatus in the vehicle width direction can be located in the recess, so that widening of the vehicle can be avoided.

Accordingly, while, with widening of the vehicle avoided, the exhaust apparatus, which is light, is laid out on the vehicle-width-direction outer side, a heavy object can be laid out at the vehicle center, thus contributing to enhancement of a motion performance of the vehicle.

As long as the recess is a portion (recessed portion) recessed toward the vehicle-width-direction inner side from the vehicle-width-direction outer side in a cross-sectional view of the side sill which is orthogonal to the vehicle front-rear direction, the recess is not limited to a portion whose intermediate portion in the vehicle up-down direction is recessed toward the vehicle-width-direction inner side, and may be a portion recessed in a cutout shape from an upper end thereof in the vehicle up-down direction toward the lower side or from a lower end thereof in the vehicle up-down direction toward the upper side.

As the exhaust apparatus, for example, not limited to an exhaust system member, which will be described later, at least one of the exhaust system member and the exhaust pipe, which will be described later, can be disposed at the recess.

In an aspect of the present disclosure, the exhaust apparatus has an exhaust pipe and an exhaust system member, and the exhaust system member has a larger cross-sectional area orthogonal to the passing direction of exhaust gas than the exhaust pipe, and is disposed at the recess in such a manner that the passing direction is substantially parallel to the longitudinal direction of the side sill. According to this configuration, the exhaust system member having the larger cross-sectional area orthogonal to the passing direction of exhaust gas than the exhaust pipe is disposed at the recess in such a manner that the passing direction is substantially parallel to the longitudinal direction of the side sill, so that, in such a case where the exhaust system member is disposed at a vehicle body side portion, widening of the vehicle can be avoided.

Here, as long as the exhaust system member is a member through which exhaust gas exhausted from the internal combustion engine passes, the exhaust system member is not limited to a member such as a GPF including, for example, a filter that treats exhaust gas (gas) from the internal combustion engine and may be, for example, a member having a silencing function such as a silencer or a catalyzer. Furthermore, the exhaust system member may include a portion (component) including a connection function for connecting to another exhaust system member or the exhaust pipe.

In another aspect of the present disclosure, an opening through which an occupant enters and exits the vehicle cabin space is formed above the side sill, and the side sill has a side sill upper portion overlapping with the exhaust system member in the vehicle width direction on the upper side relative to the exhaust system member. According to this configuration, the exhaust system member is covered from above by the side sill upper portion, so that the side sill can function as a heat shielding member against heat release from the exhaust system member.

Accordingly, when the occupant enters and exits the vehicle cabin space through the opening, heat damage to the occupant due to the heat release from the exhaust system member can be prevented.

In a further aspect of the present disclosure, the side sill upper portion is a closed cross-sectional structure having a closed cross-sectional space inside. According to this configuration, the closed cross-sectional space provided inside the side sill upper portion can make the occupant even less likely to feel heat when the occupant enters and exits the vehicle cabin space.

In a still further aspect of the present disclosure, on the vehicle-width-direction outer side of the side sill upper portion, an eaves is provided which extends outward in the vehicle width direction and downward and covers the exhaust system member from above. According to this configuration, the side sill upper portion is provided with the eaves extending merely outward in the vehicle width direction and downward from the vehicle-width-direction outer side, so that, while an amount of shielding of heat released upward from the exhaust system member is more enhanced, the shielding range can be more expanded. Accordingly, it is possible to make the occupant even less likely to feel heat when the occupant enters and exits the vehicle cabin space.

In another aspect of the present disclosure, the exhaust system member is formed to have a long length in the vehicle front-rear direction along a lower edge of the opening and is formed so as to be higher on the rear side than on the front side in the vehicle front-rear direction, and the side sill upper portion is formed so as to be higher on the rear side than on the front side in the vehicle front-rear direction corresponding to a vehicle side view shape of the exhaust system member. According to this configuration, the side sill upper portion is formed so as to be higher on the rear side than on the front side, so that the lower edge of the opening can be formed in such a manner that a front-side portion thereof becomes lower than a rear-side portion thereof. Accordingly, it is possible for the occupant to smoothly enter and exit the vehicle cabin space through the opening.

On the other hand, the side sill upper portion is formed corresponding to the vehicle side view shape of the exhaust system member, so that the exhaust system member disposed at the recess can be firmly covered from above by the side sill upper portion. Thus, the side sill can effectively function as a heat shielding member against the heat release from the exhaust system member. According to this configuration, even in a case where the exhaust apparatus is provided on the vehicle-width-direction outer side relative to the side sill, widening of the vehicle can be avoided.

DETAILED DESCRIPTION

An embodiment of the present disclosure will be explained with reference to the following drawings. A vehicle of the present embodiment is a sports car adopting a so-called space frame structure coupling a plurality of extruded frames made of an aluminum alloy and forming a vehicle body framework, and adopting a center pillar-less structure in which a side door is of a two-door type. A side vehicle body structure of such a vehicle will be explained with reference to FIGS. 1 to 5.

In order to clarify illustration, in the figures, illustration of a front suspension and a rear suspension is omitted, and detailed illustration of a suspension support member supporting these suspensions, which will be described later, is omitted.

In the figures, arrow F indicates the vehicle front direction; arrow R, the vehicle right direction; arrow L, the vehicle left direction; arrow U, the vehicle upper direction.

Figure 1:
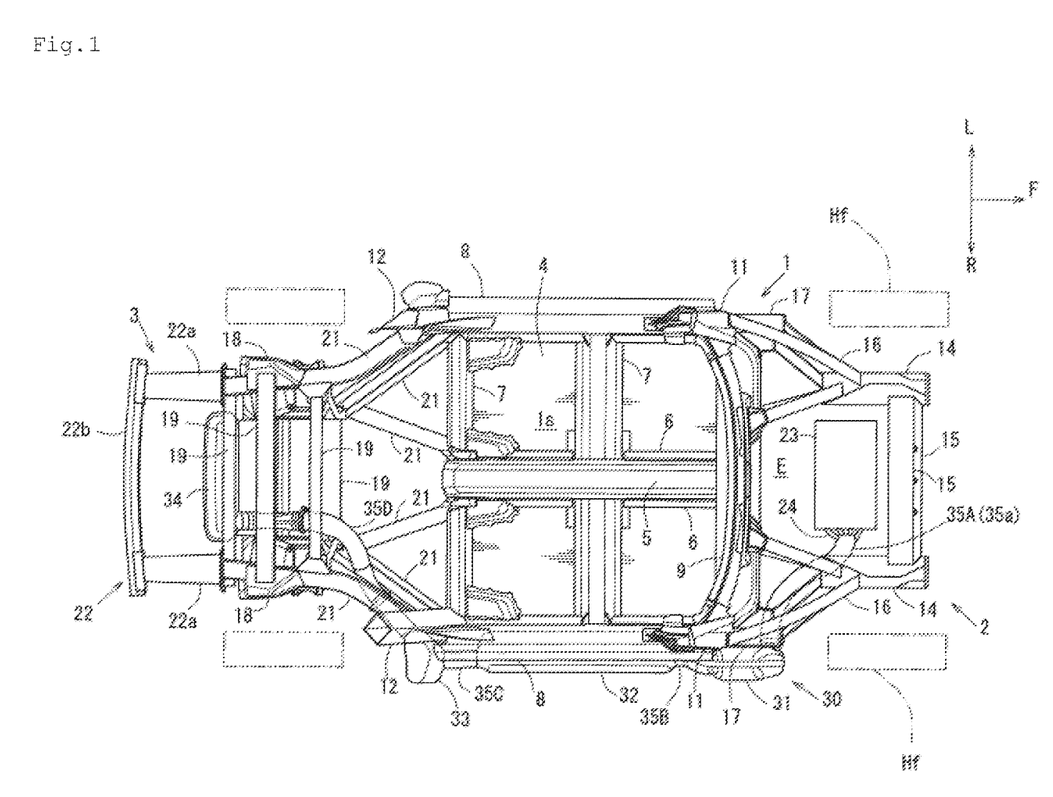
FIG. 1 is a plan view illustrating a main portion of a vehicle including a side vehicle body structure of the present embodiment.
Figure 2:
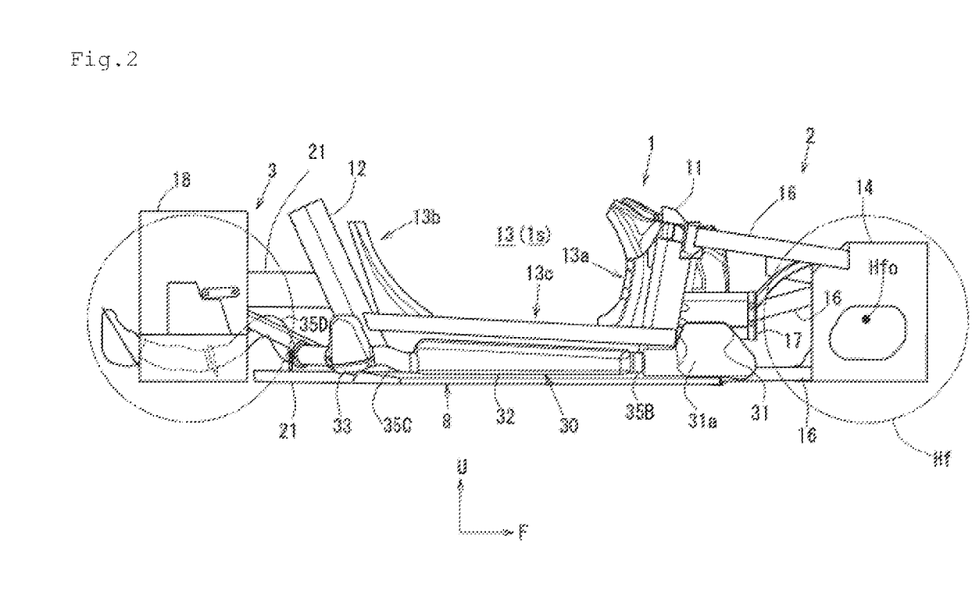
FIG. 2 is a left side view illustrating the main portion of the vehicle including the side vehicle body structure of the present embodiment.

As illustrated in FIGS. 1 and 2, the vehicle including the side vehicle body structure of the present embodiment includes a vehicle cabin 1 for an occupant to get in, a front vehicle body 2 provided on the vehicle front side relative to the vehicle cabin 1, and a rear vehicle body 3 provided on the vehicle rear side relative to the vehicle cabin 1.

As illustrated in FIG. 1, the vehicle cabin 1 and the front vehicle body 2 are partitioned by a dash panel 9 in a raised wall shape. The dash panel 9 serves as a partition wall defining a front edge of a vehicle cabin space is provided inside the vehicle cabin 1 and is disposed between the vehicle cabin 1 and the front vehicle body 2.

As also illustrated in FIG. 1, the vehicle cabin 1 includes a floor panel 4 forming a floor (floor surface) of the vehicle cabin 1, a tunnel frame 5 extending in the vehicle front-rear direction above a center position of the floor panel 4 in the vehicle width direction, a tunnel side frame 6 extending in the vehicle front-rear direction at a corner between a side wall on each of both sides of the tunnel frame 5 and the floor panel 4, and a plurality of floor cross members 7 each coupling the tunnel frame 5 and a side sill 8 in the vehicle width direction.

Furthermore, as illustrated in FIGS. 1 and 2, both sides of the floor panel 4 of the vehicle cabin 1 in the vehicle width direction include the pair of left and right side sills 8 extending in the vehicle front-rear direction, hinge pillars 11 (front-side pillars) each extending upward from a front end of the side sill 8, and rear pillars 12 (rear-side pillars) each extending upward from a rear end of the side sill 8.

Also, as illustrated in FIG. 2, on the above-described both sides of the vehicle cabin 1, door openings 13 through which the occupant enters and exits the vehicle cabin 1 are provided. A hinge pillar 11, a rear pillar 12, and the side sill 8 are provided along a front edge 13a, rear edge 13b, and lower edge 13c of the door opening 13, respectively.

As illustrated in FIGS. 1 and 2, the front vehicle body 2 includes a pair of left and right front suspension support members 14 supporting a front suspension (illustration omitted), a plurality of front-side cross members 15 (see FIG. 1) each coupling the pair of left and right front suspension support members 14 in the vehicle width direction, a plurality of front-side coupling frames 16 each coupling the vehicle cabin 1 and the front suspension support member 14, and a front shock absorption structure (illustration omitted) that absorbs a shock load from the vehicle front side.

As illustrated in FIG. 1, the front suspension support member 14 is located on the vehicle-width-direction inner side of the side sill 8 corresponding to each of the left and right sides and pivotally supports a front wheel Hf via the front suspension, which is not illustrated. The front wheel Hf is provided on the vehicle front side relative to the front end of the side sill 8 and on the vehicle-width-direction outer side relative to the front suspension support member 14. The front suspension support member 14 is manufactured by, for example, die cast molding of an aluminum alloy.

As also illustrated in FIGS. 1 and 2, the front vehicle body 2 includes, at a position spaced apart rearward from the front wheel Hf, a tire stopper frame 17 extending toward the vehicle front side from a front portion of the hinge pillar 11.

Although illustration is omitted, the front shock absorption structure includes a crash can formed of, for example, a cylindrical body extending in the vehicle front-rear direction from the front end side of the front suspension support member 14, and a bumper reinforcement extending in the vehicle width direction so as to couple front ends of the pair of left and right crash cans.

The rear vehicle body 3 includes a pair of left and right rear suspension support members 18 supporting a rear suspension, a plurality of rear-side cross members 19 (see FIG. 1) each coupling the pair of left and right rear suspension support members 18 in the vehicle width direction, a plurality of rear-side coupling frames 21 each coupling the vehicle cabin 1 and the rear suspension support member 18, and a rear shock absorption structure 22 that absorbs a shock load from the vehicle rear side. Illustration of not only the above-described front shock absorption structure but also the rear shock absorption structure 22 is omitted in FIG. 2.

As illustrated in FIG. 1, the rear shock absorption structure 22 includes a crash can 22a formed of, for example, a cylindrical body extending toward the vehicle rear side from the rear end side of the rear suspension support member 18, and a bumper reinforcement 22b extending in the vehicle width direction so as to couple rear ends of the pair of left and right crash cans 22a.

As also illustrated in FIG. 1, in a front portion of the vehicle of the present embodiment, an area between the pair of left and right front suspension support members 14 is formed as an engine room E, and the engine room E is equipped with an engine 23.

An exhaust apparatus 30 (exhaust unit) is connected to an exhaust port provided on the side wall side of engine 23, via an exhaust manifold 24. The exhaust apparatus 30 includes, as exhaust system members, a GPF 31 (gasoline particulate filter), a first pre-silencer 32, a second pre-silencer 33, a main silencer 34, and a tail pipe (illustration omitted). The exhaust manifold 24 and the GPF 31 are connected by a connection part 35A, the above-described exhaust system members 31 and 32 are connected by a connection part 35B, the above-described exhaust system members 32 and 33 are connected by a connection part 35C, and the above-described exhaust system members 33 and 34 are connected by a connection part 35D.

The GPF 31 has a body 31a including a filter 31aa that, as an exhaust treatment device that treats exhaust gas of the engine 23, collects a particulate matter (PM) included in the exhaust gas. Each of the silencers (the first pre-silencer 32, the second pre-silencer 33, and the main silencer 34) reduces a sound when the exhaust gas is released to the atmosphere.

Although the connection parts 35A, 35B, 35C, and 35D are formed by mainly an exhaust pipe 35a, the connection parts 35A, 35B, 35C, and 35D are provided at, as exhaust system members, the GPF 31, the silencers 32, 33, and 34, and the like and also formed to include the exhaust pipe 35a and connection portions having a function of connecting to the other exhaust system members 31, 32, 33, and 34. Each of the connection parts 35A, 35B, 35C, and 35D, not limited to formation including both the exhaust pipe 35a and the connection portion provided in the exhaust system member, can be formed by at least one of these.

In the exhaust apparatus 30, the GPF 31, the first pre-silencer 32, the second pre-silencer 33, and the main silencer 34 are each routed along an exhaust path extending rearward from the front side of the vehicle body via the connection part. In this example, the exhaust apparatus 30 is routed along an exhaust path such that the exhaust path bypasses the vehicle-width-direction outer side (the vehicle right side, in this example) in the middle of extending toward the vehicle rear side. Specifically, the exhaust apparatus 30 is routed in the front vehicle body 2 from, in the vehicle width direction, the inner side equipped with the engine 23 toward the outer side and routed toward the vehicle rear side along a side portion of the vehicle cabin 1, and the exhaust apparatus 30 is routed again in the rear vehicle body 3 from the vehicle-width-direction outer side toward the inner side and routed toward the vehicle rear side.

Thus, the exhaust system member, which is relatively light, is laid out on the vehicle-width-direction outer side, so that a heavy object can be laid out at the vehicle center relative to the exhaust system member, consequently contributing to enhancement of motion performance of the vehicle.

Hereinafter, the vehicle body side structure of the present embodiment will be explained in more detail with reference to FIGS. 3 to 5. As illustrated in FIGS. 4B and 5, the side sill 8 is configured with a two-divided structure including a side sill upper 81 and a side sill lower 82 on the upper and lower sides. The side sill upper 81 and the side sill lower 82 are both frame members each formed by extrusion of an aluminum alloy material as described above, and respectively have closed cross-sectional spaces 83s and 84s (see FIG. 5) inside which extend over the full length in the vehicle front-rear direction.

The side sill upper 81 is formed by integrating a closed cross-section portion 83 (hereinafter also referred to as the "upper-side closed cross-section portion 83") having the closed cross-sectional space 83a inside, and a lower flange 85 extending downward from a vehicle-width-direction inner end of the upper-side closed cross-section portion 83 and a lower end thereof. Furthermore, as illustrated in the same figure, the side sill lower 82 is formed by integrating a closed cross-section portion 84 (hereinafter also referred to as the "lower-side closed cross-section portion 84") having the closed cross-sectional space 84s inside, and an upper flange 86 extending upward from the vehicle-width-direction inner side of the lower-side closed cross-section portion 84 and an upper end thereof.

As illustrated in FIG. 4B, the upper-side closed cross-section portion 83 and the lower-side closed cross-section portion 84 both extend in the vehicle front-rear direction so as to overlap with the pillars 11 and 12 on the front and rear sides in a vehicle side view. The side sill lower 82 of the present embodiment extends over the full length of the side sill 8 in the vehicle front-rear direction.

Figure 3:
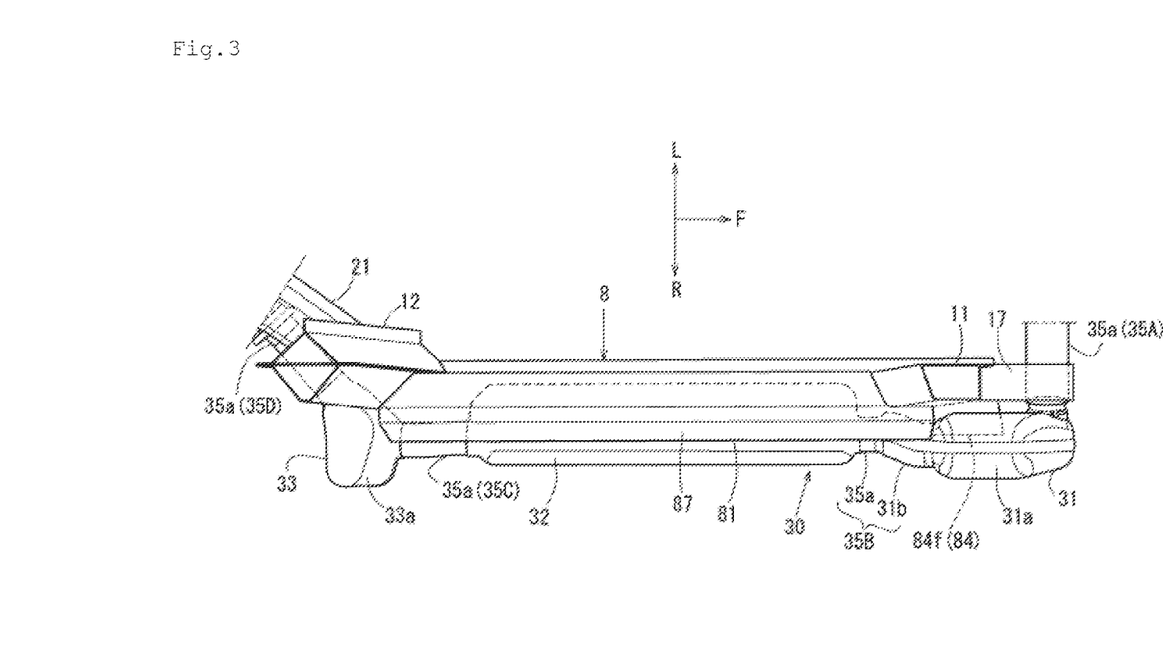
FIG. 3 is a plan view illustrating a main portion of the side vehicle body structure of the present embodiment.

Furthermore, as illustrated in FIGS. 3 and 5, the upper-side closed cross-section portion 83 and the lower-side closed cross-section portion 84 are both formed to be longer in the vehicle width direction than the pillars 11 and 12 on the front and rear sides. The upper-side closed cross-section portion 83 and the lower-side closed cross-section portion 84 in the present embodiment are both formed so that outer ends thereof in the vehicle width direction project toward the vehicle-width-direction outer side relative to vehicle-width-direction outer faces of the pillars 11 and 12 on the front and rear sides.

As illustrated in FIG. 5, an upper wall 83u and lower wall 83d of the upper-side closed cross-section portion 83 are both formed inclinedly so as to be located upward toward the vehicle-width-direction outer side and extend parallel to each other in the vehicle front-rear direction. As illustrated in FIGS. 3 and 5, in the upper wall 83u, an outer-side portion in the vehicle width direction relative to the pillars 11 and 12 on the front and rear sides is formed in such a manner that an interval with the lower wall 83d in the vehicle up-down direction decreases stepwise. Thus, the upper-side closed cross-section portion 83 is formed in a tapered shape in which the outer side in the vehicle width direction becomes gradually narrower in the vehicle up-down direction.

As illustrated in FIG. 5, on the vehicle-width-direction outer side relative to the upper-side closed cross-section portion 83 of the side sill upper 81, an eaves 87 is provided which extends in a flange shape outward in the vehicle width direction and downward from a vehicle-width-direction outer end of the upper-side closed cross-section portion 83 and covers the first pre-silencer 32 as an exhaust system member, which will be described later, from above.

As further illustrated in FIG. 5, a lower wall 84d of the lower-side closed cross-section portion 84 is substantially horizontally formed along the vehicle width direction, while an upper wall 84u is moderately inclined so as to be located downward toward the vehicle-width-direction outer side. Thereby, the lower-side closed cross-section portion 84 is formed in a substantially triangular shape in which a cross section orthogonal to the vehicle front-rear direction becomes longer in the vehicle width direction than in the vehicle up-down direction and the length in the vehicle up-down direction becomes shorter toward the vehicle-width-direction outer side.

As illustrated in FIGS. 4B and 5, in the above-described side sill upper 81 and side sill lower 82, the lower flange 85 and the upper flange 86 overlap with each other in a vehicle side view (in the vehicle up-down direction and the vehicle front-rear direction). In this example, as illustrated in FIG. 5, the lower flange 85 of the side sill upper 81 and the upper flange 86 of the side sill lower 82 are disposed in such a manner that the lower flange 85 and the upper flange 86 are respectively located on the vehicle-width-direction outer side and the vehicle-width-direction inner side, in a mutually overlapping portion 93.

The side sill upper 81 and the side sill lower 82 are joined to each other in this overlapping portion 93 by being arc-welded (MIG welding, in this example) alternately from the vehicle-width-direction inner and outer sides along the vehicle front-rear direction (see reference character w in FIG. 5).

As described above, in the side sill 8, the lower flange 85 and the upper flange 86 can be integrated by welding the mutually overlapping portion 93, forming a coupling wall 90 coupling vehicle-width-direction inner ends of the upper-side closed cross-section portion 83 and the lower-side closed cross-section portion 84 in the up-down direction. Thereby, the side sill 8 is configured so that the closed cross-section portion 83 of the side sill upper 81 and the closed cross-section portion 84 of the side sill lower 82 are disposed so as to be spaced apart from each other in the up-down direction via the coupling wall 90 and, between these closed cross-section portions 83 and 84 on the upper and lower sides and the coupling wall 90, a recess 91 is provided which opens toward the vehicle-width-direction outer side (see FIGS. 4B and 5).

As illustrated in FIG. 2, the side sill 8 extends in the vehicle front-rear direction so as to form the lower edge 13c of the door opening 13 of a vehicle body side portion, as described above. Additionally, the side sill 8 extends inclinedly in the vehicle front-rear direction in such a manner that the upper-side closed cross-section portion 83, namely, an upper end of the side sill 8, is located downward toward the front side (see FIGS. 2 and 4A-B).

Thereby, the lower edge 13c of the door opening 13 can be formed inclinedly so as to be located upward toward the vehicle rear side along the upper-side closed cross-section portion 83 (see FIG. 2). Accordingly, while increase in the size of the door opening 13 over the entire vehicle front-rear direction is avoided, the vehicle front side can be located downward compared with the vehicle rear side, so that, when the occupant enters and exits the vehicle cabin space via the door opening 13, smooth accessibility is enabled.

The above-described side sill 8 and pillars 11 and 12 on the front and rear sides are integrally joined by arc welding (MIG welding, in this example). Specifically, as illustrated in FIG. 4B, the upper-side closed cross-section portion 83 and the lower-side closed cross-section portion 84 in the present embodiment both extend in the vehicle front-rear direction so as to overlap with the hinge pillar 11 in the vehicle front-rear direction. In this example, in the upper-side closed cross-section portion 83, a front end extends up to substantially the same position as a front end of the hinge pillar 11 in the vehicle front-rear direction. The lower-side closed cross-section portion 84 includes a front extending portion 84f extending toward the vehicle front side relative to each of the front ends of the upper-side closed cross-section portion 83 and the hinge pillar 11 in the vehicle front-rear direction, and is integrally formed with the front extending portion 84f. Note that the front extending portion 84f extends toward the vehicle front side until a front end thereof is located on the vehicle rear side relative to a front end of the tire stopper frame 17.

Figure 4A:
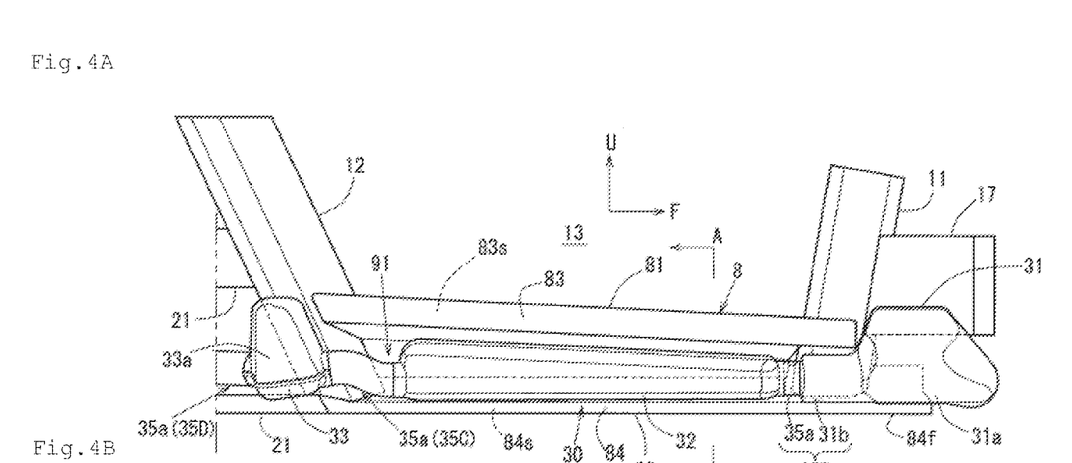
FIG. 4A is a left side view illustrating the main portion of the side vehicle body structure of the present embodiment.
Figure 4B:
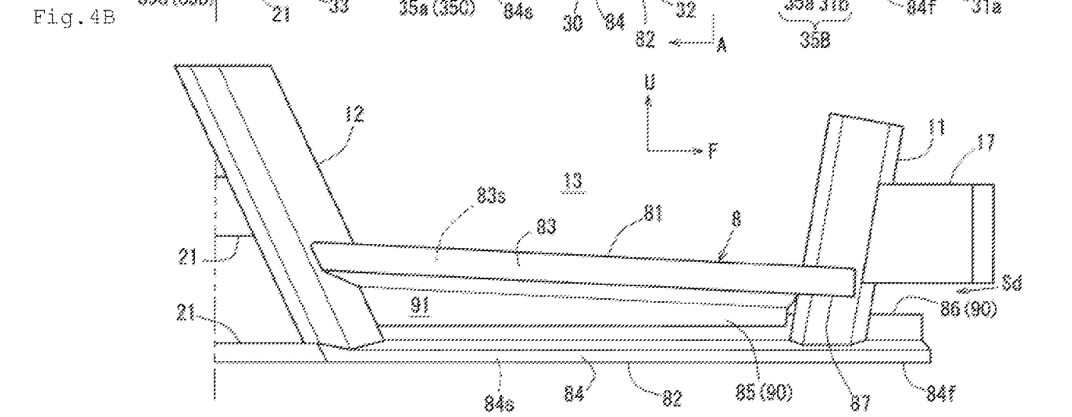
FIG. 4B is a left side view illustrated with an exhaust system member removed from FIG. 4A.
Figure 5:
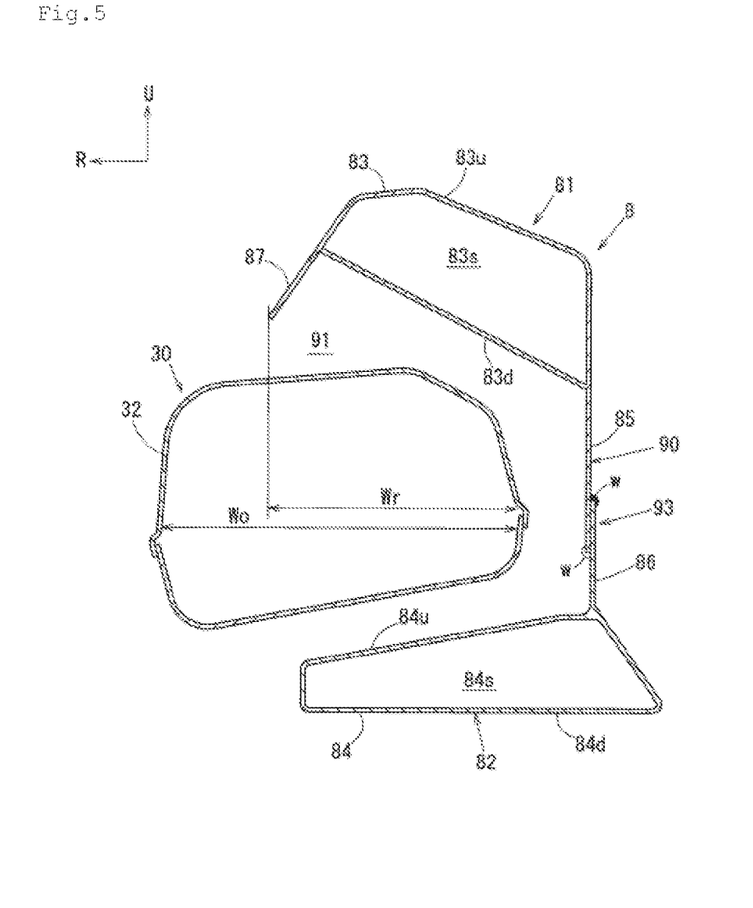
FIG. 5 is a cross-sectional view taken along line A-A in FIG. 4A.

Further, as illustrated in FIGS. 3 and 4, at a front portion of the side sill 8, the hinge pillar 11 is provided to protrude at the lower-side closed cross-section portion 84 in such a manner that the hinge pillar 11 projects toward the vehicle upper side from a vehicle-width-direction inner-side portion of the upper-side closed cross-section portion 83, in a posture inclined so as to be located on the vehicle front side toward the vehicle upper side. The hinge pillar 11 is an extruded member made of an aluminum alloy which is extruded in a rectangular shape in which a cross section orthogonal to the longitudinal direction inside forms a closed cross-section.

In the hinge pillar 11 as described above, a portion facing each of the upper-side closed cross-section portion 83, the coupling wall 90, and the lower-side closed cross-section portion 84 is integrally joined thereto by arc welding or the like.

At a rear portion of the side sill 8, the rear pillar 12 is provided to protrude in a columnar shape at the lower-side closed cross-section portion 84 in such a manner that the rear pillar 12 projects toward the vehicle upper side from the vehicle-width-direction inner-side portion of the upper-side closed cross-section portion 83, in a posture inclined so as to be located on the vehicle rear side toward the vehicle upper side. The rear pillar 12 is an extruded member made of an aluminum alloy which is extruded in a rectangular shape in which a cross section orthogonal to the longitudinal direction inside forms a closed cross-section.

In the rear pillar 12 as described above, a portion facing each of the upper-side closed cross-section portion 83, the coupling wall 90, and the lower-side closed cross-section portion 84 is integrally joined thereto by arc welding or the like.

As illustrated in FIG. 3, the above-described tire stopper frame 17 is also referred to as a reinforcement for small overlap collision resistance (reinforcement for SORB) and is a frame for receiving the front wheel Hf (see FIGS. 1 and 2) receding at the time of small overlap collision, and suppressing entering of the front wheel Hf into the vehicle cabin 1. The tire stopper frame 17 has a rear end joined to a front face of the hinge pillar 11, and a front end horizontally extending in the vehicle front-rear direction up to a position in front of a rearmost end of the front wheel Hf. Thereby, in the tire stopper frame 17, the front end is disposed at a position spaced apart toward the vehicle rear side from the rearmost end of the front wheel Hf (see FIGS. 1 and 2). Furthermore, as illustrated in FIGS. 4A-B, the tire stopper frame 17 is formed by extrusion in such a manner that a cross section thereof which is orthogonal to the vehicle front-rear direction is formed in a closed cross-sectional shape.

Further, as illustrated in FIGS. 1 and 2, in the exhaust apparatus 30, each of the GPF 31, the first pre-silencer 32, and the second pre-silencer 33 is disposed in this order toward the vehicle rear side along a lower portion of the vehicle body side portion (a vehicle right-side portion, in this example). Specifically, the GPF 31 includes the body 31a in which the filter 31aa is incorporated, and a connection portion 31b formed to have a smaller width than the body 31a. In the GPF 31, the body 31a is mainly disposed, in a vehicle body lower portion, on the vehicle front side relative to the hinge pillar 11 and on the vehicle-width-direction outer side relative to the tire stopper frame 17.

The above-described front extending portion 84f provided at a front portion of the lower-side closed cross-section portion 84 of the side sill 8 extends up to immediately under the GPF 31 disposed on the vehicle-width-direction outer side relative to the tire stopper frame 17. The GPF 31 is supported so as to be placed on a top face of the front extending portion 84f. The body 31a of the GPF 31 and the engine 23 (exhaust manifold 24) provided on the vehicle-width-direction inner side relative to the body 31a are connected by the connection part 35A (hereinafter referred to as the "first connection part 35A") extending in the vehicle width direction between these. The first connection part 35A is formed by the exhaust pipe 35a provided as a part of the exhaust apparatus 30. In a vehicle plan view, the tire stopper frame 17 intervenes between the GPF 31 and the engine 23, while the first connection part 35A extends in the vehicle width direction across a space Sd (see FIG. 4B) provided below the tire stopper frame 17.

As illustrated in FIGS. 2 and 4A, the first pre-silencer 32 is formed to have a long length in the vehicle front-rear direction along the side sill 8 provided at the lower edge 13c of the door opening 13. The first pre-silencer 32 is formed to have substantially a constant length in the vehicle width direction over the full length in the vehicle front-rear direction and formed in a vehicle side view shape in which the first pre-silencer 32 is inclined so as to become gradually higher toward the vehicle rear side.

On the other hand, the recess 91 is formed to have a length in the vehicle front-rear direction which is slightly longer than that of the first pre-silencer 32 in the vehicle front-rear direction. Furthermore, the recess 91 has a length in the vehicle up-down direction which is slightly longer than that of the first pre-silencer 32 in the vehicle up-down direction, and is formed in an inclined shape so as to become gradually higher toward the vehicle rear side corresponding to the above-described vehicle side view shape of the first pre-silencer 32.

As illustrated in FIGS. 3 and 5, the first pre-silencer 32 is disposed on the vehicle-width-direction outer side relative to a vehicle-width-direction inner end of the side sill 8 in such a manner that at least a part of the first pre-silencer 32 in the vehicle width direction overlaps with the side sill 8. Thus, the entire first pre-silencer 32 except for an outer-side portion thereof in the vehicle width direction is accommodated in the recess 91 of the side sill 8 over the full length of the vehicle front-rear direction (see FIG. 3).

Although in this embodiment, the first pre-silencer 32 is accommodated in the recess 91 of the side sill 8, an exhaust system member other than the first pre-silencer 32 may be accommodated therein. The accommodation of the exhaust system member in the recess 91 also includes a case where, not limited to the entire exhaust system member in the vehicle width direction, at least a part of the exhaust system member in the vehicle width direction is disposed on the vehicle-width-direction inner side relative to a position on the outermost side of the side sill 8 in the vehicle width direction. For example, the accommodation of the exhaust system member in the recess 91 also includes a case where, not limited to the entire exhaust system member in the vehicle width direction, at least a part thereof overlaps in the vehicle width direction with a portion of the side sill 8 corresponding to the recess 91 in the vehicle width direction.

Also, the overlapping of at least a part of the exhaust system member in the vehicle width direction may have an overlapping amount in which the occupant is less likely to feel heat at the time of entering and exiting the vehicle astride the side sill 8. Specifically, in an example in which, as the exhaust system member, the first pre-silencer 32 is accommodated in the recess 91 as in this example, a length (Wr) of the first pre-silencer 32 at a portion of the side sill corresponding to the recess 91 in the vehicle width direction is desirably equal to or more than 50% of a length (Wo) of the first pre-silencer 32 in the vehicle width direction, as illustrated in FIG. 5. In this accommodation state, a vehicle-width-direction inner end of the first pre-silencer 32 is disposed on the vehicle-width-direction outer side relative to the coupling wall 90 (vehicle width inner wall) of the side sill 8, and the first pre-silencer 32 is supported so as to be placed on a top face of the lower-side closed cross-section portion 84.

In this state, the first pre-silencer 32 is disposed so as to overlap with the eaves 87 and the upper-side closed cross-section portion 83 which are provided in the side sill upper 81, in the vehicle width direction. That is, the eaves 87 and the upper-side closed cross-section portion 83 in the side sill 8 are provided so as to cover the first pre-silencer 32 from immediately thereabove.

Furthermore, as illustrated in FIGS. 3 and 4A, the GPF 31 disposed on the vehicle front side of the hinge pillar 11 and the first pre-silencer 32 disposed on the vehicle rear side thereof are connected by the connection part 35B (hereinafter referred to as the "second connection part 35B"). The second connection part 35B is formed by the exhaust pipe 35a and the connection portion 31b provided in the GPF 31. The connection portion 31b provided in the GPF 31 is formed in a pipe shape extending toward the vehicle rear side from a rear end of the body 31a of the GPF 31 and is connected to the exhaust pipe 35a so as to fit the exhaust pipe 35a from a front portion thereof.

As illustrated in FIG. 3, the second connection part 35B is formed to have a smaller length in the vehicle width direction than both the GPF 31 and the first pre-silencer 32. Further, the second connection part 35B substantially horizontally extends at a position on the vehicle-width-direction outer side as close as possible to the hinge pillar 11 astride the hinge pillar 11 in the vehicle front-rear direction. The second connection part 35B is also formed to have a length which is longer than that of the hinge pillar 11 in the vehicle front-rear direction so as to be capable of connecting the GPF 31 disposed on the vehicle front side of the hinge pillar 11 and the first pre-silencer 32 disposed on the vehicle rear side of the hinge pillar 11.

As described above, in a state where, while the exhaust pipe 35a is disposed near the hinge pillar 11 side as much as possible (on the vehicle-width-direction inner side), the GPF 31, the exhaust pipe 35a, and the first pre-silencer 32 are disposed in substantially a linear shape along the vehicle front-rear direction, in the first pre-silencer 32, at least a vehicle-width-direction inner-side portion relative to a vehicle-width-direction outer face of the hinge pillar 11 is accommodated in the recess 91 of the side sill 8, while the GPF 31 (the body 31a of the GPF 31, in particular) is disposed on the vehicle-width-direction outer side relative to the tire stopper frame 17, as described above.

Also, as described above, in the side sill upper 81 of the side sill 8, namely, in the eaves 87 and the upper-side closed cross-section portion 83, each of front ends is formed up to substantially the same position as the front end of the hinge pillar 11 in the vehicle front-rear direction (see FIGS. 2 and 4A-B). Thus, so as to cover not only the first pre-silencer 32 but also the second connection part 35B disposed on the vehicle-width-direction outer side of the hinge pillar 11 from the vehicle upper side, the eaves 87 and the upper-side closed cross-section portion 83 are each provided at a position spaced apart upward from the second connection part 35B.

Furthermore, as illustrated in FIGS. 3 and 4A, the second pre-silencer 33 is disposed at a portion going around, with respect to the rear pillar 12, from forward to rearward and from the outer side to the inner side in the vehicle width direction. The second pre-silencer 33 as described above is connected to the connection part 35C (also referred to as the "third connection part 35C") connecting to the first pre-silencer 32 provided on the vehicle front side at a front end portion of the body 33a, and is connected to the connection part 35D (also referred to as the "fourth connection part 35D") connecting to the main silencer 34 (see FIG. 1) provided at the vehicle-width-direction center and on the vehicle rear side, on the vehicle-width-direction inner side of the body 33a and at a vehicle rear portion.

As illustrated in FIGS. 1 and 2, the above-described side vehicle body structure of the vehicle in the present embodiment is a side vehicle body structure of a vehicle which includes the engine 23 (internal combustion engine) (see FIG. 1) equipped on the front side of the dash panel 9 (partition wall) defining the front edge of the vehicle cabin space 1s, the exhaust apparatus 30 through which exhaust gas exhausted from the engine 23 passes, and the side sill 8 extending along the vehicle front-rear direction on the side of the floor panel (floor) forming the floor surface of the vehicle cabin space 1s. As illustrated in FIGS. 4B and 5, the side sill 8 has a recess 91 having a cross section recessed toward the vehicle-width-direction inner side from the vehicle-width-direction outer side in a cross-sectional view orthogonal to the vehicle front-rear direction and extending in the vehicle front-rear direction, and, as illustrated in FIGS. 1 to 3, 4A, and 5, the first pre-silencer 32 (the exhaust system member provided in the exhaust apparatus) provided in the exhaust apparatus 30 is disposed at the recess 91.

According to this configuration, even in a case where a vehicle-width-direction inner end of the first pre-silencer 32 is provided on the vehicle-width-direction outer side relative to the vehicle-width-direction inner end of the side sill 8, at least a part of the first pre-silencer 32 in the vehicle width direction can be located in the recess 91, so that widening of the vehicle can be avoided. With widening of the vehicle avoided, the first pre-silencer 32, which is light, can be laid out on the vehicle-width-direction outer side, and a heavy object can be laid out at the vehicle center, thus contributing to enhancement of the motion performance of the vehicle.

In an aspect of the present disclosure, as illustrated in FIGS. 3 and 4A, the exhaust apparatus 30 includes the exhaust pipe 35a and the exhaust system members 31, 32, 33, and 34, and the exhaust system members 31, 32, 33, and 34 have a larger cross-sectional area orthogonal to the passing direction (vehicle front-rear direction) of exhaust gas than the exhaust pipe 35a, and are disposed at the recess 91 in such a manner that the passing direction is substantially parallel to the longitudinal direction of the side sill 8. According to this configuration, the exhaust system members 31, 32, 33, and 34 having the larger cross-sectional area orthogonal to the passing direction of exhaust gas than the exhaust pipe 35a are disposed at the recess 91 in such a manner that the passing direction is substantially parallel to the longitudinal direction of the side sill 8, so that, in such a case where the exhaust system members 31, 32, 33, and 34 are disposed at the vehicle body side portion, widening of the vehicle can be avoided.

In a further aspect of the present disclosure, as illustrated in FIG. 2, the door opening 13 (opening) through which the occupant enters and exits the vehicle cabin space of the vehicle cabin 1 is formed above the side sill 8, and, as illustrated in FIG. 5, the side sill 8 has the side sill upper 81 overlapping with the first pre-silencer 32 in the vehicle width direction on the upper side relative to the first pre-silencer 32. According to this configuration, when the occupant enters and exits the vehicle cabin space of the vehicle cabin 1 through the door opening 13, heat damage to the occupant due to heat release from the first pre-silencer 32 can be prevented.

Specifically, in a case where, for enhancement of the motion performance of the vehicle, the first pre-silencer 32 is provided adjacent to the vehicle-width-direction outer side of the side sill 8, when the occupant enters and exits the vehicle cabin space of the vehicle cabin 1 through the door opening 13, there is a concern about heat damage in which, for example, the occupant feels heat due to heat released from the first pre-silencer 32. However, in the present embodiment, the first pre-silencer 32 can be covered from above by the side sill upper 81 as an upper side portion of the recess 91, and the side sill upper 81 can function as a heat shielding member against the heat release from the first pre-silencer 32. Accordingly, when the occupant enters and exits the vehicle cabin space of the vehicle cabin 1 through the door opening 13, the heat damage to the occupant due to the heat release from the first pre-silencer 32 can be prevented.

In another aspect of the present disclosure, as illustrated in FIG. 5, the side sill upper 81 includes the upper-side closed cross-section portion 83 having the closed cross-sectional space 83s inside. According to this configuration, the closed cross-sectional space 83s provided inside the upper-side closed cross-section portion 83 in the side sill upper 81 can make the occupant even less likely to feel heat when the occupant enters and exits the vehicle cabin space of the vehicle cabin 1.

In a still further aspect of the present disclosure, as illustrated in FIG. 5, on the vehicle-width-direction outer end of the upper-side closed cross-section portion 83 of the side sill upper 81, the eaves 87 is provided which extends outward in the vehicle width direction and downward from the vehicle-width-direction outer end and covers the first pre-silencer 32 from above. According to this configuration, the eaves 87 extends not only outward in the vehicle width direction but also downward from the vehicle-width-direction outer side of the side sill upper 81, so that, while an amount of shielding of heat released upward from the first pre-silencer 32 is more enhanced, the shielding range can be more expanded. Accordingly, it is possible to make the occupant even less likely to feel heat when the occupant enters and exits the vehicle cabin space of the vehicle cabin 1.

In a further aspect of the present disclosure, as illustrated in FIGS. 2 and 4A, the first pre-silencer 32 is formed to have the long length in the vehicle front-rear direction along the lower edge 13c of the door opening 13 and is formed so as to be higher on the rear side than on the front side in the vehicle front-rear direction, and the side sill upper 81 is formed so as to be higher on the rear side than on the front side in the vehicle front-rear direction corresponding to the vehicle side view shape of the first pre-silencer 32. According to this configuration, the side sill upper 81 is formed so as to be higher on the rear side than on the front side, so that the lower edge 13c (see FIG. 2) of the door opening 13 can be formed in such a manner that a front-side portion thereof becomes lower than a rear-side portion thereof. Accordingly, it is possible for the occupant to smoothly enter and exit the vehicle cabin space of the vehicle cabin 1 through the door opening 13.

On the other hand, for example, in a case where a gap (space) open toward the vehicle-width-direction outer side is formed between the first pre-silencer 32 and the side sill upper 81 covering the first pre-silencer 32 from above, there is a concern that heat released from the first pre-silencer 32 diffuses toward the vehicle upper side from the vehicle-width-direction outer side through the gap and the occupant may be damaged by the heat. In contrast, as described above, the side sill upper 81 is formed corresponding to the vehicle side view shape of the first pre-silencer 32, so that the first pre-silencer 32 disposed at the recess 91 can be firmly covered from above by the side sill upper 81. Thus, the side sill 8 can effectively function as a heat shielding member against the heat release from the first pre-silencer 32.

The present disclosure is not limited to only the configurations of the above-described embodiment and can be formed in various embodiments. For example, although in the above-described embodiment, the first pre-silencer 32 is disposed at the recess 91 of the side sill 8, the present disclosure is not limited to this embodiment, and the other exhaust system members 31, 33, and 34 or only the exhaust pipe 35a may be disposed at the recess 91 of the side sill 8. Even in a case where only the exhaust pipe 35a is accommodated (disposed) in the recess 91, a configuration may be used in which, similarly to the exhaust system member such as the first pre-silencer 32, not limited to the entire width direction of the exhaust pipe 35a, at least a part thereof is accommodated in the recess 91.

What is claimed is:
1. A side vehicle body structure of a vehicle comprising:
an internal combustion engine equipped on a front side of a partition wall defining a front edge of a vehicle cabin space;
an exhaust apparatus through which exhaust gas exhausted from the internal combustion engine passes; and
a side sill extending along a vehicle front-rear direction on a side of a floor forming a floor surface of the vehicle cabin space,
wherein the side sill comprises a recess having a cross section recessed toward a vehicle-width-direction inner side from a vehicle-width-direction outer side in a cross-sectional view orthogonal to the vehicle front-rear direction and extending in the vehicle front-rear direction,
the exhaust apparatus is disposed at the recess,
the exhaust apparatus comprises an exhaust pipe and an exhaust system member,
the exhaust system member has a larger cross-sectional area orthogonal to a passing direction of exhaust gas than the exhaust pipe, and is disposed at the recess in such a manner that the passing direction is substantially parallel to a longitudinal direction of the side sill,
the exhaust system member is a silencer,
the recess has a length in the vehicle front-rear direction greater than a length of the silencer in the vehicle front-rear direction,
the silencer has a substantially constant length in the vehicle width direction over its full length in the vehicle front-rear direction and has a shape, in a vehicle side view, such that the silencer is inclined and becomes gradually higher toward the vehicle rear side, and
the recess has an inclined shape such that it becomes gradually higher toward the vehicle rear side corresponding to the vehicle side view shape of the silencer.

2. The side vehicle body structure of a vehicle according to claim 1,
wherein an opening through which an occupant enters and exits the vehicle cabin space is located above the side sill, and
the side sill comprises a side sill upper portion overlapping with the exhaust system member in a vehicle width direction on an upper side relative to the exhaust system member.

3. The side vehicle body structure of a vehicle according to claim 2,
wherein the side sill upper portion is a closed cross-sectional structure comprising a closed cross-sectional space inside.

4. The side vehicle body structure of a vehicle according to claim 3, comprising an eaves disposed on a vehicle-width-direction outer side of the side sill upper portion, the eaves extending outward in the vehicle width direction and downward and covering the exhaust system member from above.

5. The side vehicle body structure of a vehicle according to claim 4,
wherein the exhaust system member has a long length in the vehicle front-rear direction along a lower edge of the opening and is higher on a rear side than on a front side in the vehicle front-rear direction, and
the side sill upper portion is higher on a rear side than on a front side in the vehicle front-rear direction corresponding to a vehicle side view shape of the exhaust system member.

6. The side vehicle body structure of a vehicle according to claim 2, comprising an eaves disposed on a vehicle-width-direction outer side of the side sill upper portion, the eaves extending outward in the vehicle width direction and downward and covering the exhaust system member from above.

7. The side vehicle body structure of a vehicle according to claim 2,
wherein the exhaust system member has a long length in the vehicle front-rear direction along a lower edge of the opening and is higher on a rear side than on a front side in the vehicle front-rear direction, and
the side sill upper portion is higher on a rear side than on a front side in the vehicle front-rear direction corresponding to a vehicle side view shape of the exhaust system member.

8. The side vehicle body structure of a vehicle according to claim 6,
wherein the exhaust system member has a long length in the vehicle front-rear direction along a lower edge of the opening and is higher on a rear side than on a front side in the vehicle front-rear direction, and
the side sill upper portion is higher on a rear side than on a front side in the vehicle front-rear direction corresponding to a vehicle side view shape of the exhaust system member.

\* \* \* \* \*